April 29, 1952  W. VUTZ  2,595,028
VEHICLE BODY STRUCTURE

Filed Aug. 2, 1949  2 SHEETS—SHEET 1

INVENTOR.
WILHELM VUTZ
BY
Alden D. Redfield
ATTORNEYS

April 29, 1952     W. VUTZ     2,595,028
VEHICLE BODY STRUCTURE
Filed Aug. 2, 1949     2 SHEETS—SHEET 2
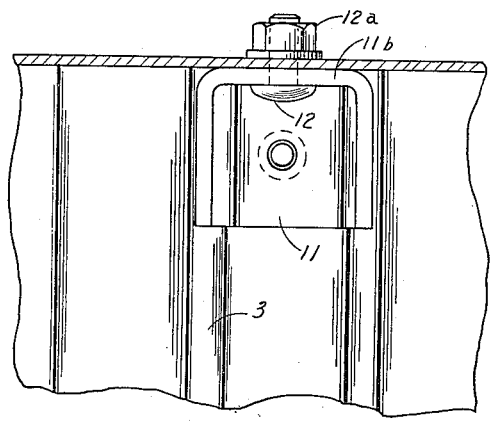
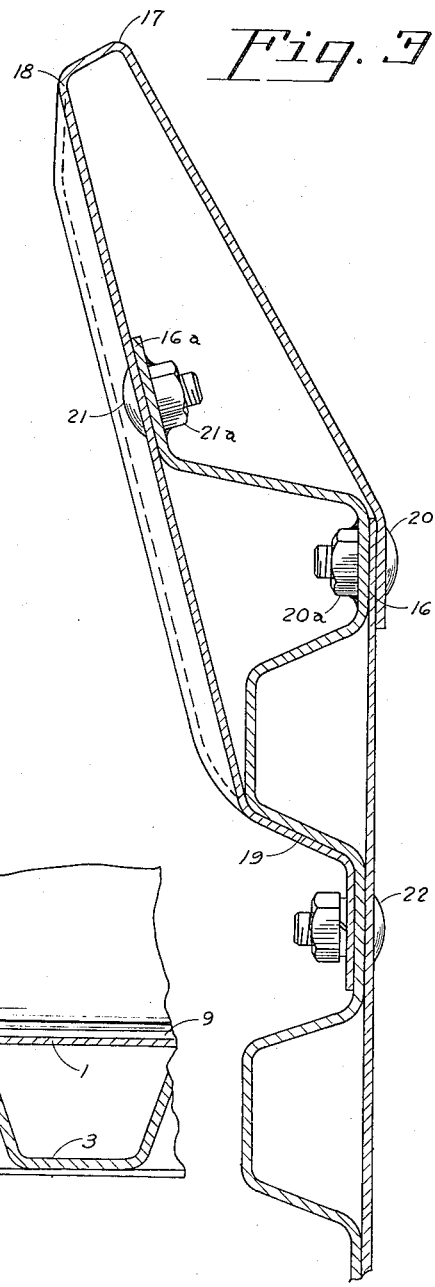
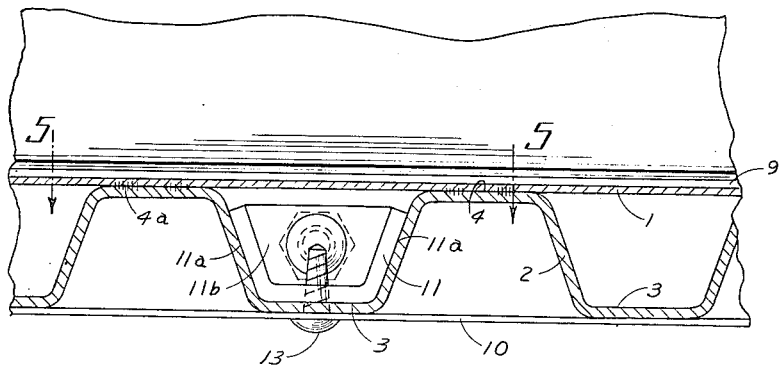
INVENTOR.
WILHELM VUTZ
BY
ATTORNEYS Patented Apr. 29, 1952

2,595,028

UNITED STATES PATENT OFFICE 2,595,028

VEHICLE BODY STRUCTURE

Wilhelm Vutz, Coldwater, Ohio, assignor to Avco Manufacturing Corporation, Cincinnati, Ohio, a corporation of Delaware Application August 2, 1949, Serial No. 108,101

4 Claims. (Cl. 296—28)

The present invention relates to a structural arrangement for the body of a vehicle or like conveyance and has particular reference to a body construction for a manure spreader or similar farm vehicle.

In the past, manure spreaders and similar farm vehicles have been constructed primarily of wood, the wooden members being riveted or bolted to a wooden or steel framework. Such vehicles have earned an enviable record of performance. However, in the past, these vehicles have been loaded for the most part by hand with the result that during the loading process no abnormal or severe strains were imposed on the body of the vehicle.

Mechanical and hydraulic loaders for loading manure and similar materials into manure spreaders are becoming increasingly prevalent and in some cases such loading devices are capable of handling individual scoops of manure weighing six hundred pounds or more. Often these relatively large scoops of material are dropped from heights of three to four feet onto the spreader body with the result that relatively great strains are imposed thereon.

The structural arrangement of the present invention makes mechanical loading of manure spreaders and similar farm vehicles possible without ill effect. In addition, vehicle bodies, made according to the present invention, possess other advantages which will hereinafter become apparent or be specifically pointed out.

It is an object of the present invention to provide a relatively lightweight vehicle body having sufficient rigidity to eliminate the need for a separate skeletal structure or framework.

Another object of the present invention is the provision of a lightweight vehicle body which is capable of withstanding severe strains such as imposed thereon during the mechanical loading of material thereinto.

A still further object of the present invention is the provision of a vehicle that has a high strength to weight ratio.

Another object of the present invention is the provision of a body structure which is simple and economical to manufacture and which may be assembled by high speed production methods, such as spot welding.

A still further object of the present invention is the provision of a vehicle body structure having corrosion resistant interior surfaces.

A still further object of the present invention is the provision of a body structure which is composed of panels or sections which are easily assembled by conventional fastening means.

Another object of the present invention is the provision of lightweight, rigid flare boards which may be simply and economically formed and readily attached to the side walls of the body structure.

A perferred embodiment of the present invention is illustrated in the accompanying drawings:

In Fig. 1 is shown a perspective view of an assembled vehicle body;

Fig. 3 is a cross-sectional view of a flare board, taken on plane 3—3 of Fig. 1, showing the structural association of the flare board with a side panel, with rear portions of the flare board shown in perspective;

Fig. 4 is a longitudinal sectional view of the floor panel taken on plane 4—4 of Fig. 1, showing a panel fastening bracket secured thereto;

Fig. 5 is a plan view of one of the panel fastening brackets taken substantially on plane 5—5 of Fig. 4.

Figure 1:
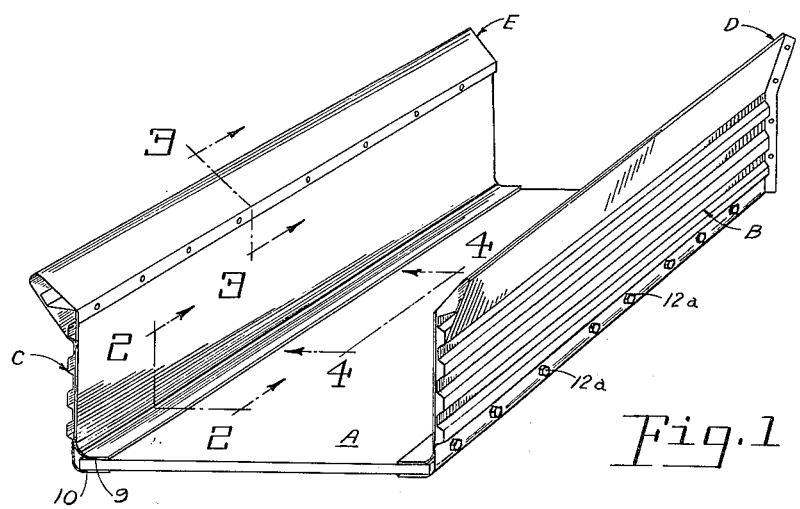

Generally considered, the vehicle body is comprised of a floor panel generally designated A in Fig. 1, to which is rigidly secured side panels generally designated B and C, secured to the upper portions of which are flare boards D and E.

As shown in Fig. 4 the floor panel consists of a horizontal supporting layer 1 to which is secured a reinforcing member 2, which is formed to define corrugations 3 transverse the longitudinal axis of the floor panel. Portions 4 of the transverse corrugations are disposed adjacent to the lower surface of the supporting layer and are joined thereto by any suitable means, such as spot welding, indicated at 4a. This arrangement of the corrugated reinforcing member and supporting layer forms a floor panel having a high strength to weight ratio and a relatively great transverse rigidity.

Figure 2:
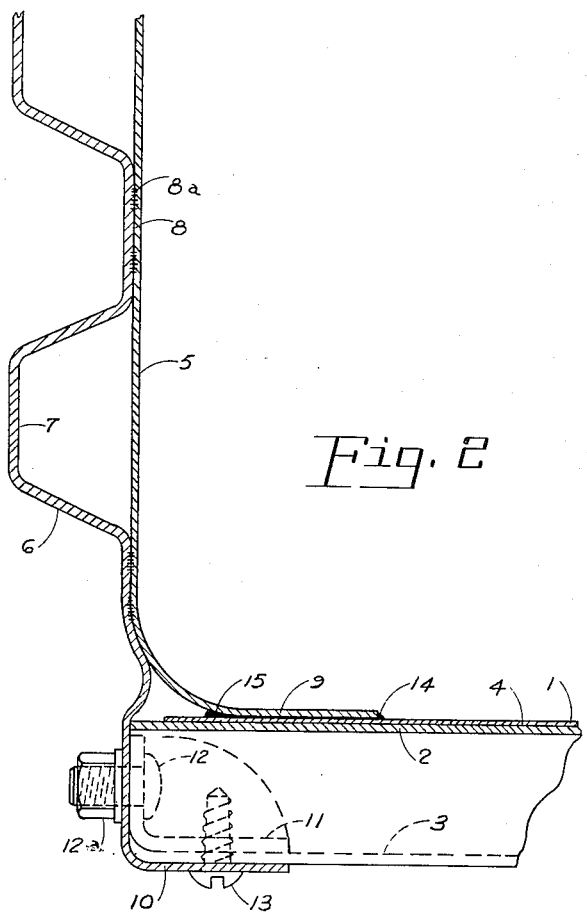
Fig. 2 is a cross-sectional view, taken on plane 2—2 of Fig. 1, showing in dash lines a bracket for fastening a side panel to the floor panel of the structure.

With reference to Fig. 2, each side panel comprises a wall layer 5 to which is secured by spot welding or other suitable means a reinforcing member 6, which is formed to define longitudinal corrugations 7, portions of the longitudinal corrugations being adjacent to wall layer 5 as at 8 to permit such spot welding, indicated at 8a.

Wall layer is 5 extended downwardly beyond the reinforcing corrugations and is curved through 90° to form a portion 9 normal to the main part of the wall layer. The reinforcing member of each side panel is also extended downwardly and is formed to define a right angle section having a plane portion 10 parallel to portion 9 of the wall layer.

Before the side panels and floor panel are assembled, a plurality of brackets 11 are secured by any suitable fastening means, such as bolts 12 and nuts 12a, to the extended reinforcing members of the side panels. The brackets are spaced to correspond in position with the transverse corrugations of the floor panel, substantially as shown in Figs. 4 and 5.

After the brackets have been secured to the side panels, the floor panel is introduced between portions 9 and 10 thereof. Screws 13 or other similar fastening means are then introduced from the bottom side of the floor panel, passing through portion 10 of the side panel reinforcing member and being threadedly engaged in brackets 11.

As an alternate construction, bolts 12 may be preassembled, as by welding, to brackets 11 and the brackets thereafter assembled to the floor panel by screws 13. The side panels and floor panel may then be assembled as described and nuts 12a tightened to bolts 12 to complete the assembly.

Brackets 11 are formed to match the contour of the transverse corrugations to lend additional rigidity to the structure. As shown in Figs. 4 and 5, each bracket 11 conforms to the contour of a transverse corrugation along surfaces 11a and has an end wall 11b normal to the surfaces 11a for the engagement with bolts 12.

Brackets 11 may be welded to the transverse corrugations, if desired, and screws 13 may thereby be eliminated.

The curved lower portion of the wall layers eliminates the square interior corners normally present in vehicle bodies having flat sides and bottoms and thus prevents the accumulation of objectionable materials and facilitates cleaning of the interior of the vehicle body.

To increase the rigidity of the junction between the side panels and floor panel, portions 9 of the wall layers, which are overlapping and adjacent to the floor panel, may be welded or otherwise secured thereto as indicated at 14. These welds may be continuous or intermittent, and, if intermittent, sealing compound may be employed to seal the joint between the floor and side panels. Part of such sealing compound is indicated at 15.

Removability of the side panels from the floor panel may be obtained by omitting the welding at 14, sealing compound being provided at 15 during assembly. The unwelded structure has been found to have adequate strength.

The construction of the flare boards D and E is shown in Fig. 3. For simplicity and economy, each flare board may be formed from a unitary sheet, the sheet being joined on one edge to upper portion 16 of a side panel and bent outwardly from the side panel to form an obtuse angle therewith. The sheet, forming the flare board, is formed to define a right angle bend, as at 17, and then an obtuse bend, as at 18. The sheet terminates at one of the longitudinal corrugations of the side panel reinforcing member and may be formed to correspond with the shape of the corrugation, as indicated at 19.

The sheet, forming the flare board, may be secured to upper portion 16 of the side panel by any conventional means, such as bolts 20. Nuts 20a may be preassembled to the side panel reinforcing member by welding, or other suitable means, in proper spaced relationship with bolts 20. Upper portion 16a of the reinforcing member may be secured to the flare board by fasteners such as bolts 21, which engage nuts 21a welded or secured in any other manner to the interior surface of the reinforcing member before assembly of the flare board therewith. Fasteners, such as bolts 22, may be used to secure the wall layer and reinforcing member to the lower portion of the flare board.

Flare boards, constructed as described, have excellent strength although light in weight.

It is recognized that, as an alternate construction, the flare boards could be made integral with the side panels. In such a construction, the wall layer is extended and formed to provide a rigid hollow structure similar to the construction shown in Fig. 3.

A particular advantage of the present invention is that a relatively rigid structure, having an excellent appearance, may be made from light gauge materials without the need of a framework. As an example, a conventional manure spreader body, suitable for mechanical loading, may be made from 18 to 20 USS gauge material if built according to the teachings of the present invention.

Another advantage of the present construction is that corrosion resistant materials may be used to form the interior surfaces of the vehicle body, whereas lower cost materials, having no corrosion resistance, may be used to form the reinforcing members of the side panels and floor panel. A corrosion resistant material which has been used with conspicuous success for the wall layer and supporting layer of the side panels and floor panel, respectively, is Inland Hi-Steel, made by the Inland Steel Company, having offices at Chicago, Illinois. This steel has considerably increased corrosion resistance compared to ordinary, low carbon steels and has a chemical composition of:

| Element | Per Cent by Weight |
| --- | --- |
| Carbon | .12 maximum. |
| Manganese | .50 to .90. |
| Phosphorus | .050 to .120. |
| Sulphur | .05 maximum. |
| Silicon | .15 maximum. |
| Copper | .95 to 1.30. |
| Nickel | .45 to .75. |
| Molybdenum | .08 to .18. |
| Aluminum | .12 to .27. |
| And the Remainder iron. | |

Any ordinary, low carbon sheet steel of about the composition of SAE 1020 may be used satisfactorily for the reinforcing members of the side and floor panels.

It is to be understood that the specification herein of gauges and compositions of metals is for illustrative purposes only, other materials possessing comparable properties being equally suitable for use in the construction of a vehicle body of the type disclosed herein.

The sealing compound at 15 prevents the passage of corrosive agents underneath portion 9 of wall layer 5 and thus protects the low carbon steel reinforcing members from corrosive attack.

Having described a preferred embodiment of my invention, I claim:

1. In combination in a vehicle body, a floor panel comprising a supporting layer of corrosion resistant material and a transversely corrugated reinforcing member, a pair of side panels each comprising a wall layer of corrosion resistant material and a longitudinally corrugated reinforcing member, said wall layers being curved and extended to overlap and lie adjacent to said floor panel supporting layer, and a plurality of brackets disposed within and conforming to the corrugations of said floor panel for interconnecting said floor and side panels to form a rigid unitary structure.

2. In combination in a vehicle body, a floor panel comprising a supporting layer of corrosion resistant material and a transversely corrugated reinforcing member, a pair of side panels each comprising a wall layer of corrosion resistant material and a longitudinally corrugated reinforcing member, said wall layers being curved and extended to overlap and lie adjacent to said floor panel supporting layer, said side panel reinforcing members being extended and formed to lie adjacent to said floor panel reinforcing member, and a plurality of brackets disposed within the corrugations of said floor panel for connecting said floor and side panels to form a rigid unitary structure.

3. In combination in a vehicle body, a floor panel comprising a sheet of corrosion resistant material and permanently secured therebeneath a reinforcing member made from a sheet of material formed to define strengthening corrugations, a pair of side panels each comprising a sheet of corrosion resistant material and permanently secured thereto a reinforcing member made from a sheet of material formed to define strengthening corrugations, said corrosion resistant sheets of said side panels extending laterally to overlap and lie adjacent to said corrosion resistant sheet of said floor panel, sealing means disposed between the overlapping portions of said corrosion resistant sheets, a plurality of brackets disposed within the corrugations of said floor panel and a plurality of removable fasteners engaging said brackets to secure said side panels to said floor panel to form a rigid unitary structure with said corrosion resistant sheets forming the interior of the vehicle body.

4. In combination in a vehicle body, a floor panel comprising a supporting layer of corrosion resistant material and a corrugated reinforcing member permanently secured to the underside of said supporting layer, a pair of side panels each comprising a wall layer of corrosion resistant material and a corrugated reinforcing member permanently secured to the outside surface of said wall layer, said wall layers extending laterally to overlap and lie adjacent to said floor panel supporting layer, said side panel reinforcing members being extended laterally adjacent to and beneath said floor panel reinforcing member, and a plurality of brackets engaging the corrugations of said floor panel for interconnecting said floor and side panels to form a rigid unitary structure.

WILHELM VUTZ.

REFERENCES CITED

The following references are of record in the file of this patent:

UNITED STATES PATENTS

| Number | Name | Date |
| --- | --- | --- |
| 1,342,400 | Barrows | June 1, 1920 |
| 1,388,896 | Sage | Aug. 30, 1921 |
| 1,461,905 | Hughes | July 17, 1923 |
| 1,480,559 | Kohlberger | Jan. 15, 1924 |
| 1,987,798 | Ruppricht | Jan. 15, 1935 |
| 2,108,795 | Budd | Feb. 22, 1938 |
| 2,160,677 | Romanoff | May 30, 1939 |
| 2,172,571 | Theriault | Sept. 12, 1939 |
| 2,405,358 | Johnson | Aug. 6, 1946 |
| 2,504,657 | Dean | Apr. 18, 1950 |